(12) United States Patent
Fan et al.

(10) Patent No.: US 12,623,355 B2
(45) Date of Patent: *May 12, 2026

(54) METHOD AND APPARATUS FOR ESTIMATING TOUCH LOCATIONS AND TOUCH PRESSURES

(71) Applicant: SAMSUNG ELECTRONICS CO., LTD., Suwon-si (KR)

(72) Inventors: Xiaoran Fan, Secaucus, NJ (US); Daewon Lee, Princeton, NJ (US); Lawrence Jackel, Holmdel, NJ (US); Richard Howard, Highland Park, NJ (US); Daniel Dongyuel Lee, Tenafly, NJ (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/965,244

(22) Filed: Dec. 2, 2024

(65) Prior Publication Data

US 2025/0091225 A1 Mar. 20, 2025

Related U.S. Application Data

(63) Continuation of application No. 17/553,321, filed on Dec. 16, 2021, now Pat. No. 12,162,136.
(Continued)

(51) Int. Cl.
*B25J 13/08* (2006.01)
*B25J 9/16* (2006.01)
(Continued)

(52) U.S. Cl.
CPC ............. *B25J 13/084* (2013.01); *B25J 9/163* (2013.01); *B25J 9/1692* (2013.01);
(Continued)

(58) Field of Classification Search
CPC ........ B25J 13/084; B25J 19/028; B25J 9/163; G06F 3/04182; G06F 3/0436; G05B 2219/39001
See application file for complete search history.

(56) References Cited

U.S. PATENT DOCUMENTS 8,994,696 B2 3/2015 Berget et al.
2002/0158599 A1 10/2002 Fujita et al.
(Continued)

FOREIGN PATENT DOCUMENTS

CN 108228008 A 6/2018
JP 2010-112927 A 5/2010
KR 10-2019-0105767 A 9/2019

OTHER PUBLICATIONS

Seminara et al, "Electromechanical characterization of piezoelectric PVDF polymer films for tactile sensors in robotics applications," Sensors and Actuators A, vol. 169, pp. 49-58, 2011, Total 12 pages.
(Continued)

*Primary Examiner* — Priyank J Shah
(74) *Attorney, Agent, or Firm* — Sughrue Mion, PLLC

(57) ABSTRACT

A tactile sensing system of a robot may include: a plurality of piezoelectric elements disposed at an object, and including a transmission (TX) piezoelectric element and a reception (RX) piezoelectric element; and at least one processor configured to: control the TX piezoelectric element to generate an acoustic wave having a chirp spread spectrum (CSS) at every preset time interval, along a surface of the object; receive, via the RX piezoelectric element, an acoustic wave signal corresponding to the generated acoustic wave; select frequency bands from a plurality of frequency bands of the acoustic wave signal; and estimate a location of a touch input on the surface of the object by inputting the acoustic wave signal of the selected frequency bands into a
(Continued)

100

102

110

110a

110b neural network configured to provide a touch prediction score for each of a plurality of predetermined locations on the surface of the object.

20 Claims, 13 Drawing Sheets

Related U.S. Application Data

(60) Provisional application No. 63/241,909, filed on Sep. 8, 2021.

(51) Int. Cl.
  *B25J 19/02* (2006.01)
  *G06F 3/041* (2006.01)
  *G06F 3/043* (2006.01)

(52) U.S. Cl.
  CPC ........ *G06F 3/04182* (2019.05); *G06F 3/0436* (2013.01); *B25J 19/028* (2013.01); *G05B 2219/32335* (2013.01); *G05B 2219/39001* (2013.01)

(56) References Cited

U.S. PATENT DOCUMENTS

| | | | |
|---|---|---|---|
| 2010/0117978 A1 | 5/2010 | Shrado | |
| 2012/0274609 A1 | 11/2012 | Sheng et al. | |
| 2013/0257821 A1 | 10/2013 | Chaine et al. | |
| 2018/0032211 A1 | 2/2018 | King et al. | |
| 2019/0384898 A1 | 12/2019 | Chen et al. | |
| 2020/0012385 A1 | 1/2020 | Tang et al. | |
| 2020/0167036 A1 | 5/2020 | Hiraki et al. | |

OTHER PUBLICATIONS

Communication dated Sep. 12, 2024, issued by the European Patent Office in counterpart European Application No. 22867676.3.
Communication dated Dec. 5, 2022, issued by the International Searching Authority in counterpart International Application No. PCT/KR2022/013380 (PCT/ISA/220, 210, 237).
Communication issued on Jul. 11, 2025 by the European Patent Office in European Patent Application No. 22867676.3.

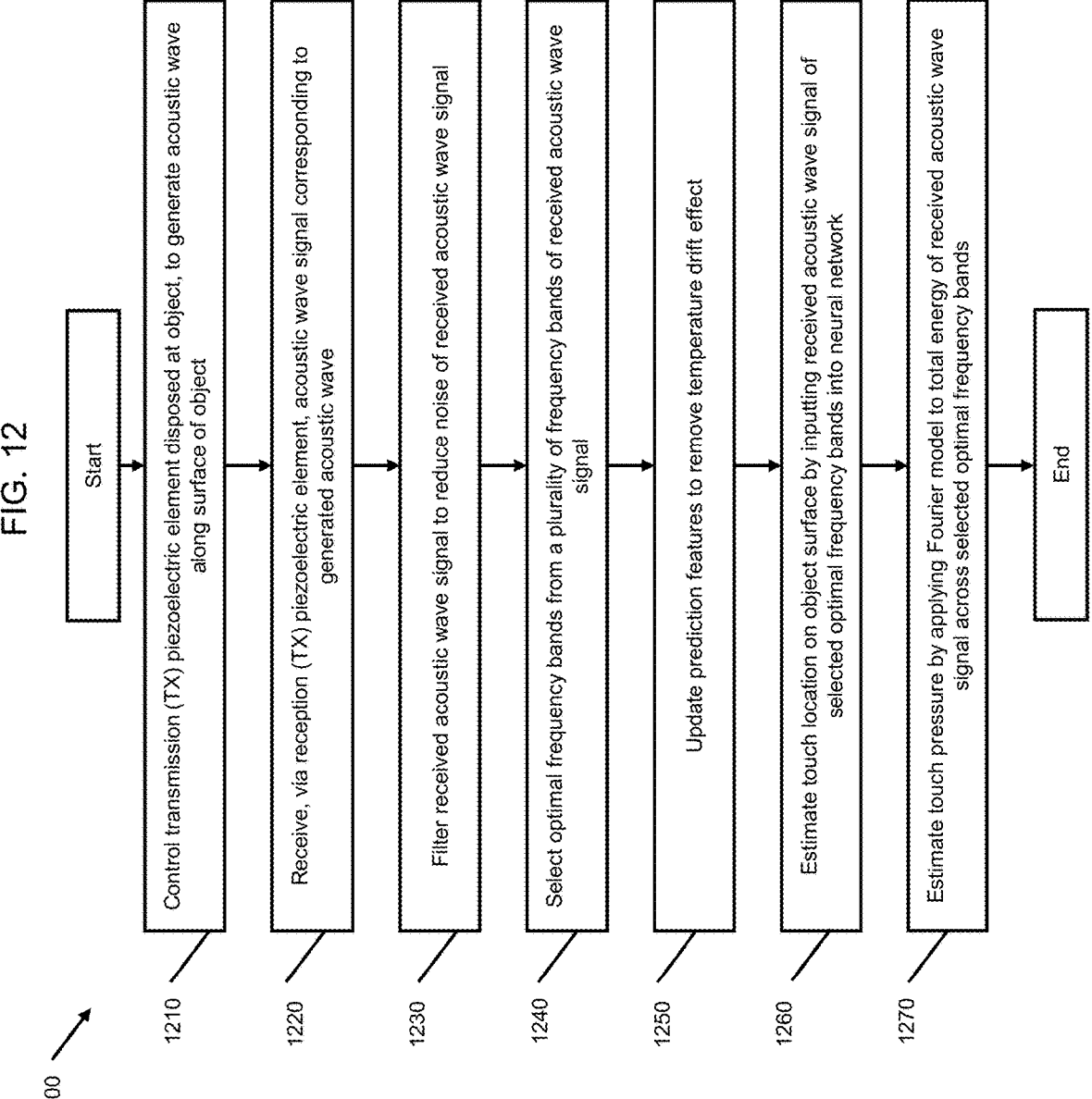

Start

1210 — Control transmission (TX) piezoelectric element disposed at object, to generate acoustic wave along surface of object 1220 — Receive, via reception (TX) piezoelectric element, acoustic wave signal corresponding to generated acoustic wave 1230 — Filter received acoustic wave signal to reduce noise of received acoustic wave signal 1240 — Select optimal frequency bands from a plurality of frequency bands of received acoustic wave signal 1250 — Update prediction features to remove temperature drift effect 1260 — Estimate touch location on object surface by inputting received acoustic wave signal of selected optimal frequency bands into neural network 1270 — Estimate touch pressure by applying Fourier model to total energy of received acoustic wave signal across selected optimal frequency bands End

METHOD AND APPARATUS FOR ESTIMATING TOUCH LOCATIONS AND TOUCH PRESSURES

CROSS-REFERENCE TO RELATED APPLICATION

This application is a continuation application of U.S. patent application Ser. No. 17/553,321, filed Dec. 16, 2021, which is based on and claims priority under 35 U.S.C. § 119 from U.S. Provisional Application No. 63/241,909 filed on Sep. 8, 2021, in the U.S. Patent & Trademark Office, the disclosures of which are incorporated by reference herein in their entireties.

BACKGROUND

1. Field

The disclosure relates to a method and an apparatus for controlling a tactile sensor to inject an acoustic wave signal to be distributed over a surface of an object, and when a touch is made at an arbitrary location of the surface, estimating either or both of a location and a pressure of the touch.

2. Description of Related Art

Tactile sensing is important for many robotic applications. For example, as robots work in dynamic environments in collaboration with humans, tactile sensing plays a key role for human-robot interactions (HRI), such as a safe robot operation around humans, providing emotional support to humans, and controlling robot behaviors according to human guidance.

Existing approaches for realizing tactile skins on robots may be divided into two methods: a first method of using tens to thousands of exteroceptive sensors such as capacitive, magnetic and infrared (IR) types of sensors, that are deployed on a robot; and a second method of using proprioception, such as motor torque, position, velocity and momentum readings coupled with inverse kinematics and dynamics, to infer a contact location and a contact force. The first method may require a bulky structure and a high manufacturing cost, and the second method may provide poor estimation results of the contact location and the contact force due to noisy and time varying properties of motors. This complicates robotic system design and adds a significant amount of extra cost and sensor management overhead.

SUMMARY

In accordance with an aspect of the disclosure, there is provided an apparatus for acquiring tactile sensing data, including: a plurality of piezoelectric elements disposed at an object, and including a transmission (TX) piezoelectric element and a reception (RX) piezoelectric element; a memory storing instructions; and at least one processor configured to execute the instructions to: control the TX piezoelectric element to generate an acoustic wave having a chirp spread spectrum (CSS) at every preset time interval, along a surface of the object, wherein the CSS has a linearly increasing frequency over time and has a constant amplitude within a predetermined frequency range; receive, via the RX piezoelectric element, an acoustic wave signal corresponding to the generated acoustic wave; select frequency bands from a plurality of frequency bands of the acoustic wave signal, based on a first variance of the acoustic wave signal that is received when the surface of the object is touched during a movement of the object, and a second variance of the acoustic wave signal that is received when there is no touch on the surface of the object during the movement of the object; and estimate a location of a touch input on the surface of the object by inputting the acoustic wave signal of the selected frequency bands into a neural network configured to provide a touch prediction score for each of a plurality of predetermined locations on the surface of the object.

The least one processor may be further configured to: filter the received acoustic wave signal, using at least one filter configured to reduce an electrical noise of the object and a mechanical noise of the object, from the received acoustic wave signal.

The object may be a robot, and the electrical noise may be a pulse-width modulation (PWM) noise of a motor of the robot, and the at least one filter may be further configured to filter the PWM noise at 30 kHz, 60 kHz, and 90 kHz of the received acoustic wave signal, and filter the mechanical noise that resides below a 20 kHz range of the received acoustic wave signal.

The least one processor may be further configured to: select a predetermined number of the frequency bands in an ascending order of a ratio of the second variance to the first variance of the received acoustic wave signal.

When $\gamma$ is a predetermined number of the frequency bands that are selected from the plurality of frequency bands, the least one processor may be further configured to: predetermine $\gamma$ such that a weighted sum of a touch prediction accuracy of the neural network and an inverse of $\gamma$ is maximized.

The least one processor may be further configured to: at a preset calibration interval, obtain a baseline touch prediction score for the plurality of predetermined locations on the surface of the object, when the surface of the object is not touched; and when the surface of the object is touched after calibration, adjust the touch prediction score obtained from the neural network based on the baseline touch prediction score.

The predetermined frequency range is a range from 20 kHz to 80 Hz, and the preset time interval is in a range from 90 ms to 110 ms.

The least one processor may be further configured to: estimate a pressure of the touch input by applying a first order Fourier model to a total energy of the received acoustic wave signal across the selected frequency bands.

In accordance with an aspect of the disclosure, there is a method for acquiring tactile sensing data, the method including: controlling a transmission (TX) piezoelectric element to generate an acoustic wave having a chirp spread spectrum (CSS) at every preset time interval, along a surface of an object, wherein the CSS has a linearly increasing frequency over time and has a constant amplitude within a predetermined frequency range; receiving, via a reception (RX) piezoelectric element, an acoustic wave signal corresponding to the generated acoustic wave; selecting frequency bands from a plurality of frequency bands of the received acoustic wave signal, based on a first variance of the acoustic wave signal that is received when the surface of the object is touched during a movement of the object, and a second variance of the acoustic wave signal that is received when there is no touch on the surface of the object during the movement of the object; inputting, the received acoustic wave signal of the selected frequency bands, into a neural network that is trained to provide a touch prediction score for each of a plurality of predetermined locations on the surface of the object; and estimating a location of a touch input based on the touch prediction score provided from the neural network.

The method may further include: filtering the received acoustic wave signal to reduce an electrical noise of the object and a mechanical noise of the object, from the received acoustic wave signal.

The object may be a robot, and the electrical noise may be a pulse-width modulation (PWM) noise of a motor of the robot, and the filtering may include: filtering the PWM noise at 30 kHz, 60 kHz, and 90 kHz of the received acoustic wave signal; and filtering the mechanical noise that resides below a 20 kHz range of the received acoustic wave signal.

The method may further include: selecting a predetermined number of the frequency bands in an ascending order of a ratio of the second variance to the first variance of the received acoustic wave signal.

$\gamma$ may be a predetermined number of the frequency bands that are selected from the plurality of frequency bands, and the method may further include: determining $\gamma$ such that a weighted sum of a touch prediction accuracy of the neural network and an inverse of $\gamma$ is maximized.

The method may further include: at a preset calibration interval, obtaining a baseline touch prediction score for the plurality of predetermined locations on the surface of the object, when the surface of the object is not touched; and based on the surface of the object being touched after calibration, adjusting the touch prediction score obtained from the neural network based on the baseline touch prediction score.

The predetermined frequency range may be a range from 20 kHz to 80 Hz, and the preset time interval may be in a range from 90 ms to 110 ms.

The method may further include: estimating a pressure of the touch input by applying a first order Fourier model to a total energy of the received acoustic wave signal across the selected frequency bands.

In accordance with an aspect of the disclosure, a non-transitory computer-readable storage medium may store instructions that, when executed by at least one processor, cause the at least one processor to: control a transmission (TX) piezoelectric element to generate an acoustic wave having a chirp spread spectrum (CSS) at every preset time interval, along a surface of an object, wherein the CSS has a linearly increasing frequency over time and has a constant amplitude within a predetermined frequency range; receive, via a reception (RX) piezoelectric element, an acoustic wave signal corresponding to the generated acoustic wave; select frequency bands from a plurality of frequency bands of the acoustic wave signal, based on a first variance of the acoustic wave signal that is received when the surface of the object is touched during a movement of the object, and a second variance of the acoustic wave signal that is received when there is no touch on the surface of the object during the movement of the object; and estimate a location of a touch input on the surface of the object by inputting the acoustic wave signal of the selected frequency bands into a neural network configured to provide a touch prediction score for each of a plurality of predetermined locations on the surface of the object.

BRIEF DESCRIPTION OF THE DRAWINGS

The above and other aspects, features, and advantages of embodiments of the disclosure will be more apparent from the following description taken in conjunction with the accompanying drawings, in which:

FIG. 12 is a flowchart of a method of estimating a touch location and a touch pressure of a touch input that is made at an arbitrary location of an object, according to embodiments.

DETAILED DESCRIPTION

A tactile sensing system according to embodiments described herein is lightweight, is cheap, can be attached to an object, such as an off-the-shelf robotic manipulator, with minimal modifications, and provides touch detection with sufficient cross-sectional area across an entire surface of the object. The system can perform full surface detection using only a single sensor pair. While example embodiments described below describe a robotic manipulator, such as a robotic arm, as an example of an object equipped with the touch-detection system and methods described herein, this disclosure contemplates equipping any suitable object with the systems and methods described herein.

In detail, the embodiments described herein use a pair of piezoelectric elements attached to a robot arm, and one of the piezoelectric elements transmits excitation signals through the robot arm to another of the piezoelectric elements. This acoustic energy transfers through a whole surface of the robot arm. When a touch is made on the robot surface, the touch changes an acoustic impedance of the sensing system. This change can be measured by another piezoelectric element attached to the arm at a point far from the touch location, providing the entire surface coverage for touch detection. The system according to one or more embodiments of the present application may be implemented using other sound producers, such as speakers and microphones without using the piezoelectric elements.

Touches at different locations on the robot surface with varying force will introduce different changes in the acoustic impedance for the sensing system. The sensing system may use the change to identify either or both of a touch location as well as a touch pressure.

To realize the above, a number of technical and implementation challenges need to be addressed.

First, both a touch location and a touch pressure will alter a wave pattern of an acoustic signal. An embodiment addresses this challenge by signaling a wideband acoustic surface wave (ASW) signal, for example, in a range from 20 kHz to 80 kHz.

Second, a robot arm itself introduces both mechanical and electrical noise that can be received by an attached piezoelectric element. An embodiment solves this issue by digitally filtering the noise and customizing a waveform, for example, using an optimal spectrum prorating algorithm (OSPA).

Third, the temperature of a robot drifts over time and alters acoustical features used in estimating a touch location and a touch pressure. To resolve this issue, an embodiment uses an online updating mechanism that enables the system to work robustly even with training data collected several months ago.

An implementation presents an end-to-end touch detection system with a pair of low cost piezoelectric elements attached to a robot arm, and demonstrating no-dead-spot touch sensing. The design may be embedded into a robot with minimum modifications.

Figures 1, 2:
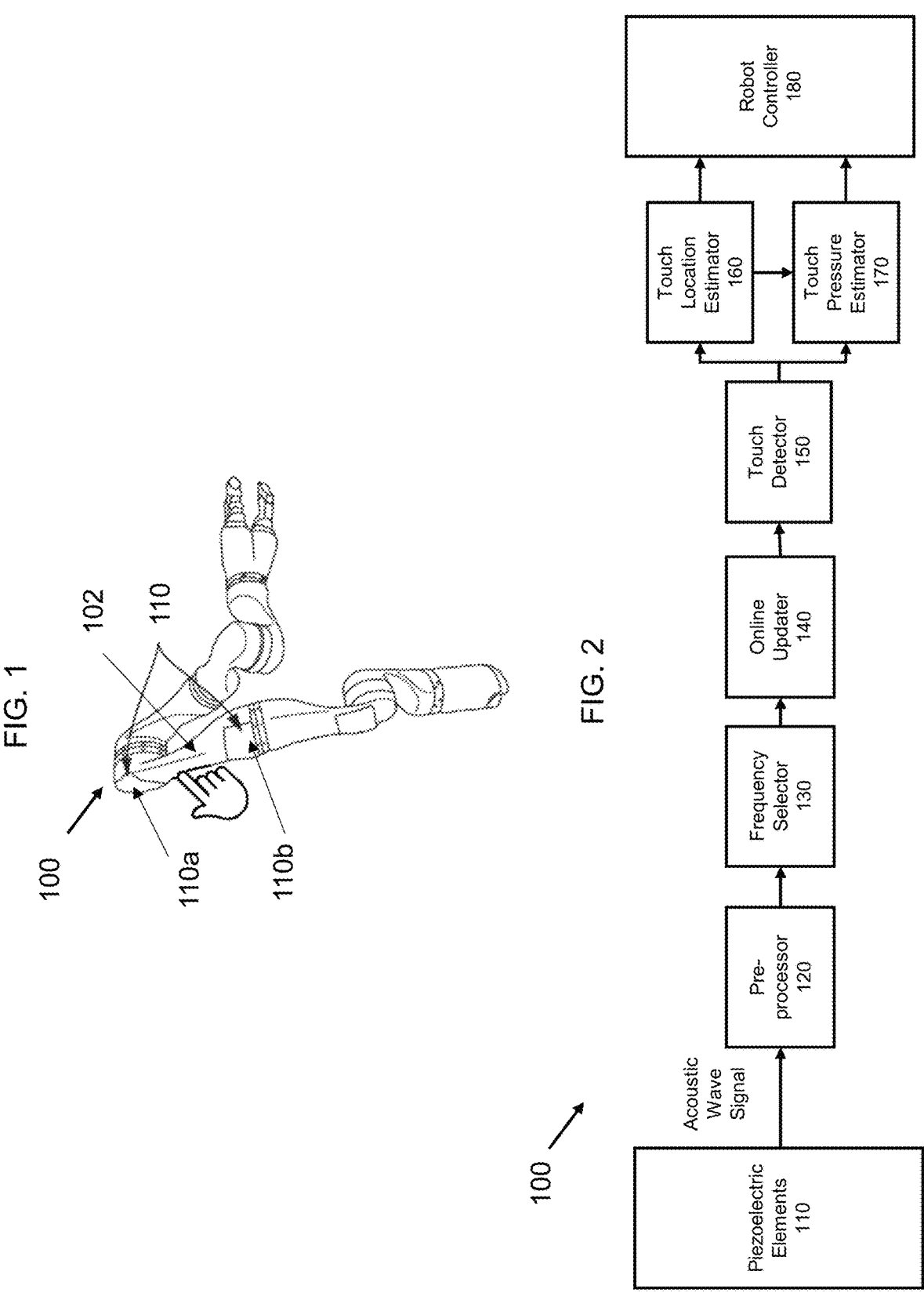
FIG. 1 is a diagram illustrating a robot tactile sensing system, according to embodiments.
FIG. 2 is a block diagram illustrating the apparatus of FIG. 1.

FIG. 1 is a diagram illustrating an apparatus 100 for full surface touch detection, according to embodiments. FIG. 2 is a block diagram illustrating the apparatus 100 of FIG. 1.

The apparatus 100 and any portion of the apparatus 100 may be included or implemented in a robot and/or an electronic device. The electronic device may include any type of electronic device, for example, a smartphone, a laptop computer, a personal computer (PC), a smart television and the like.

As shown in FIGS. 1 and 2, the apparatus 100 includes piezoelectric elements 110, a pre-processor 120, a frequency selector 130, an online updater 140, a touch detector 150, a touch location estimator 160, a touch pressure estimator 170, and a robot controller 180. The pre-processor 120, the frequency selector 130, the online updater 140, the touch detector 150, the touch location estimator 160, the touch pressure estimator 170, and the robot controller 180 may be implemented by one or more processors that use at least one neural network.

The piezoelectric elements 110 are disposed adjacent to a surface 102 of an object, e.g., the robot and/or the electronic device. For example, the piezoelectric elements 110 may be coupled to, disposed on, or embedded within the surface 102 of a robot arm. The piezoelectric elements 110 may include a transmission (TX) piezoelectric element 110a and a reception (RX) piezoelectric element 110b.

At least one processor of the apparatus 100 controls the TX piezoelectric element 110a to generate an acoustic wave within and along the surface 102 of the object. The at least one processor may apply an excitation signal to the TX piezoelectric element 110a to control the TX piezoelectric element 110a to generate an acoustic wave, for example, such as an acoustic surface wave (ASW). The ASW may be formed using a linear chirp signal that sweeps from 20 kHz to 80 kHz. The linear chirp signal may have a frequency that linearly increases over time, and has a substantially constant amplitude, within a predetermined frequency range, for example, in a range from 20 kHz to 80 kHz. The TX piezoelectric element may generate a linear chirp signal at a preset time interval T, wherein T may be in a range from 90 ms to 110 ms. While this example describes an ASW as a linear chirp signal, this disclosure contemplates that any suitable ASW signal or waveform may be used. For example, a non-linear chirp signal may be used. As another example, an ASW may include multiple frequencies at a given time, for example to increase the rate at which touch or pressure (or both) is detected. In each case, touch detection may be processed according to the procedures described below, e.g., one or more frequency bands of the ASW may be selected based on a variance of the received ASW to compute a touch-prediction score.

If the object is made out of elastic materials, such as plastic or metal, the surface 102 of the object will vibrate, and the entire surface 102 of the object functions as an acoustic transducer. The TX piezoelectric element 110a may couple with the object's surface 102 or may be embedded within the object.

The pre-processor 120 receives, via the reception (RX) piezoelectric element 110b, an acoustic wave signal corresponding to the generated acoustic wave.

Based on a touch being made on the apparatus 100, the generated acoustic wave becomes a deformed acoustic wave within and along the surface 102 of the object. The pre-processor 120 receives, via the reception (RX) piezoelectric element 110b, the deformed acoustic wave.

The pre-processor 120 may determine whether the received acoustic wave signal is valid. When the TX piezoelectric element generates the acoustic wave, the pre-processor 120 stores the acoustic wave as a reference acoustic wave, and compares a wave pattern of the received acoustic wave signal with a wave pattern of the reference acoustic wave. The pre-processor 120 may determine that the received acoustic wave signal is valid when a similarity between the wave pattern of the received acoustic wave signal and the wave pattern of the reference acoustic wave is greater than a preset threshold.

Once the received acoustic wave signal is determined to be valid, the frequency selector 130 may filter the received acoustic wave signal using at least one filter for reducing noise of the received acoustic wave signal. The frequency selector 130 may filter the received acoustic wave signal, using at least one filter configured to reduce an electrical noise of the robot and a mechanical noise of the robot, from the received acoustic wave signal. The electrical noise may include a pulse-width modulation (PWM) noise of a motor of the robot. The at least one filter may filter the PWM noise at 30 kHz, 60 kHz, and 90 kHz of the received acoustic wave signal, and may filter the mechanical noise that resides below a 20 kHz range of the received acoustic wave signal.

The frequency selector 130 may select optimal frequency bands from a plurality of frequency bands of the acoustic wave signal, based on a first variance of the acoustic wave signal that is received when the object is touched during a movement of the object, and a second variance of the acoustic wave signal that is received when the object is not touched during the movement of the robot. The first and the second variances of the acoustic wave signal may be computed for each of the plurality of frequency bands.

In particular, the frequency selector 130 may select a predetermined number $\gamma$ of the optimal frequency bands in an ascending order of a ratio of the second variance to the first variance of the received acoustic wave signal. $\gamma$ may be set such that a weighted sum of a touch prediction accuracy of a neural network (e.g., a classifier) and an inverse of γ is maximized.

The online updater 140 may update prediction features of the neural network (e.g., a classifier) configured to provide touch prediction scores for each of a plurality of predetermined locations on the robot surface, to remove the temperature drift effect of the robot. At a preset calibration interval (e.g., every 20 min), the online updater 140 may obtain a baseline touch prediction score for the plurality of predetermined locations while the robot is not touched. When the robot surface is touched after the calibration, the online updater 140 may adjust the touch prediction score obtained from the neural network, based on the baseline touch prediction score. For example, the online updater 140 obtains an updated touch prediction score by subtracting the baseline touch prediction score from the touch prediction score that is obtained from the neural network. The online updater 140 may provide the updated touch prediction score to the touch detector 150, instead of the touch prediction score that is directly obtained from the neural network, to remove the temperature drift effect.

The touch detector 150 may determine whether each of the plurality of predetermined locations is touched, based on the updated touch prediction score for each of the plurality of predetermined locations. The touch detector 150 may determine that a particular location, among the plurality of predetermined locations, is touched when a updated touch prediction score for the particular location is greater than or equal to a detection threshold, and may otherwise determine that the particular location is not touched.

The touch location estimator 160 may determine which location, among the plurality of predetermined locations, is touched, based on touch detection results of the touch detector 150. In particular, the touch location estimator 160 may determine, as a final touch location, a location having the highest touch prediction scores, among the plurality of predetermined locations.

The touch pressure estimator 170 may estimate a pressure (or force) of a detected touch by applying a first order Fourier model to a total energy of the received acoustic wave signal across the selected optimal frequency bands.

Based on the object being the robot, and based on the touch being made on the robot by a person, the robot controller 180 controls the object to interact with the person based on the estimated touch location and the estimated touch pressure.

Figure 3:
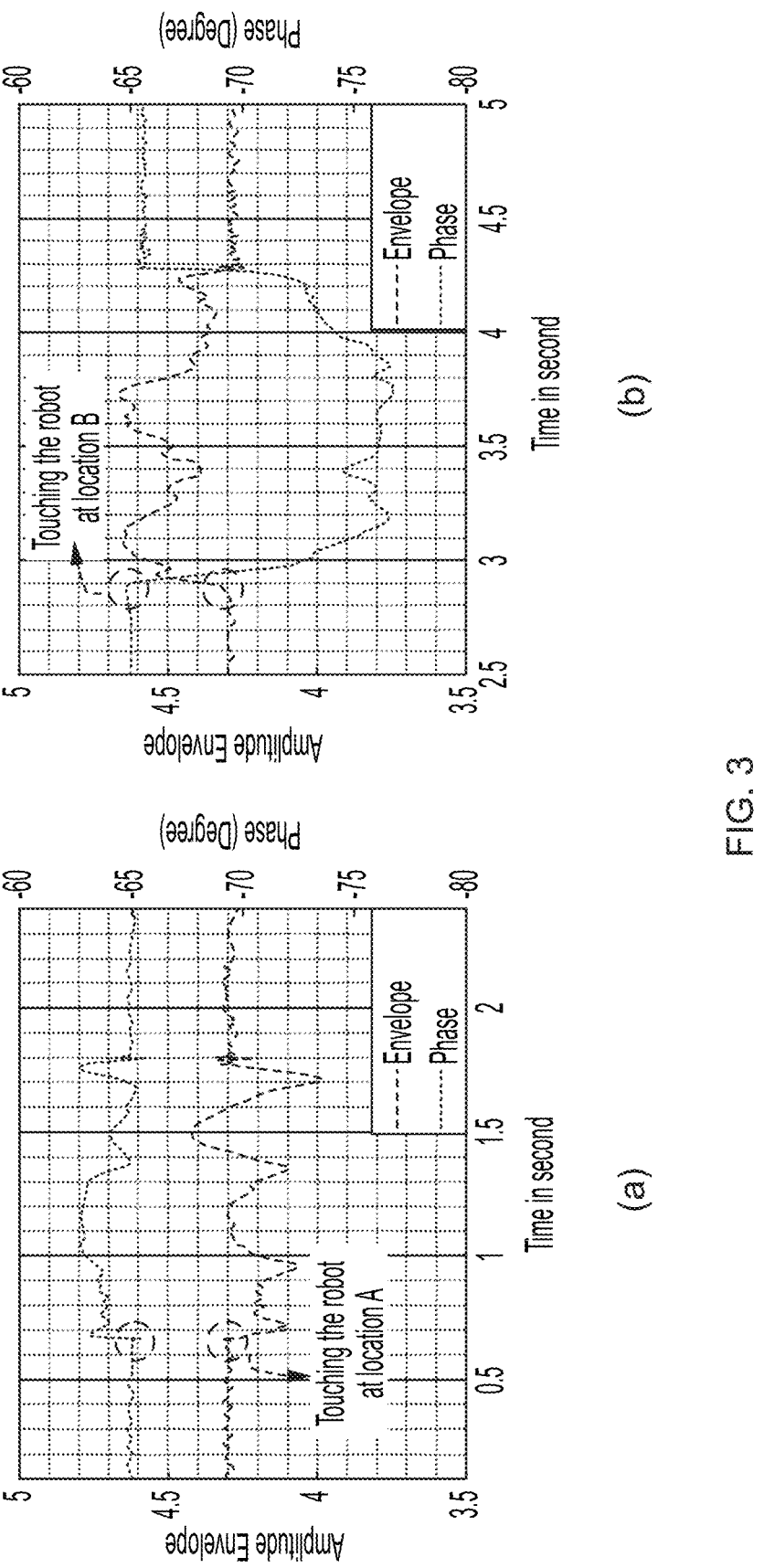
FIG. 3 shows graphs illustrating a received signal due to touching an object including the apparatus of FIGS. 1 and 2.

FIG. 3 shows graphs (a) and (b) illustrating an amplitude and a phase of a received acoustic wave signal when a robot is touched at two different locations (e.g., two different locations A and B apart from each other by 2 cm) with varying force.

When an object (e.g., a robot arm) is touched by a person's finger, an acoustic wave signal is received by a piezoelectric element mounted in the object. Touching the object introduces a major signal perturbation and changes a wave pattern of the acoustic wave signal, including peaks, dips, and a peak-to-peak distance.

This signal pattern varies depending on a location and a pressure of the touch. The change in the wave pattern of the acoustic wave signal may reflect where the person touched the robot and how hard the person touched the robot.

As shown in graphs (a) and (b) of FIG. 3, an amplitude envelope and a phase of a received acoustic wave signal respond differently to touches at different locations. The wave patterns of the amplitude envelopes and the phases shown in graphs (a) and (b) of FIG. 3 allow the tactile sensing system to differentiate touches at the two close locations. However, since an acoustic wave signal is also sensitive to a touch pressure, an embodiment of the present application customizes an acoustic wave signal to obtain physical parameters that are invariant to different touch locations with varying touch pressures.

In an embodiment of the present disclosure, the TX piezoelectric element 110a is controlled to generate an acoustic surface wave (ASW) signal having a linear chirp spread spectrum (CSS) in which frequency linearly changes between two frequencies $f_1$ and $f_2$. For example, a linear acoustic chirp signal according to an embodiment is defined based on equation (1):

$$s(t) = \sin\left(at^2 + \Omega_1 t + \phi\right) \tag{1}$$

where a denotes a slope of a frequency change in the chirp signal, $\phi$ is an initial phase of the chirp signal, t is a time vector, $0 < t < T$, T is a period of the chirp signal, $2\pi f_1 = \Omega_1$, $2\pi f_2 = \Omega_2$, and $\Omega_1 + \alpha T = \Omega_2$.

Figure 4:
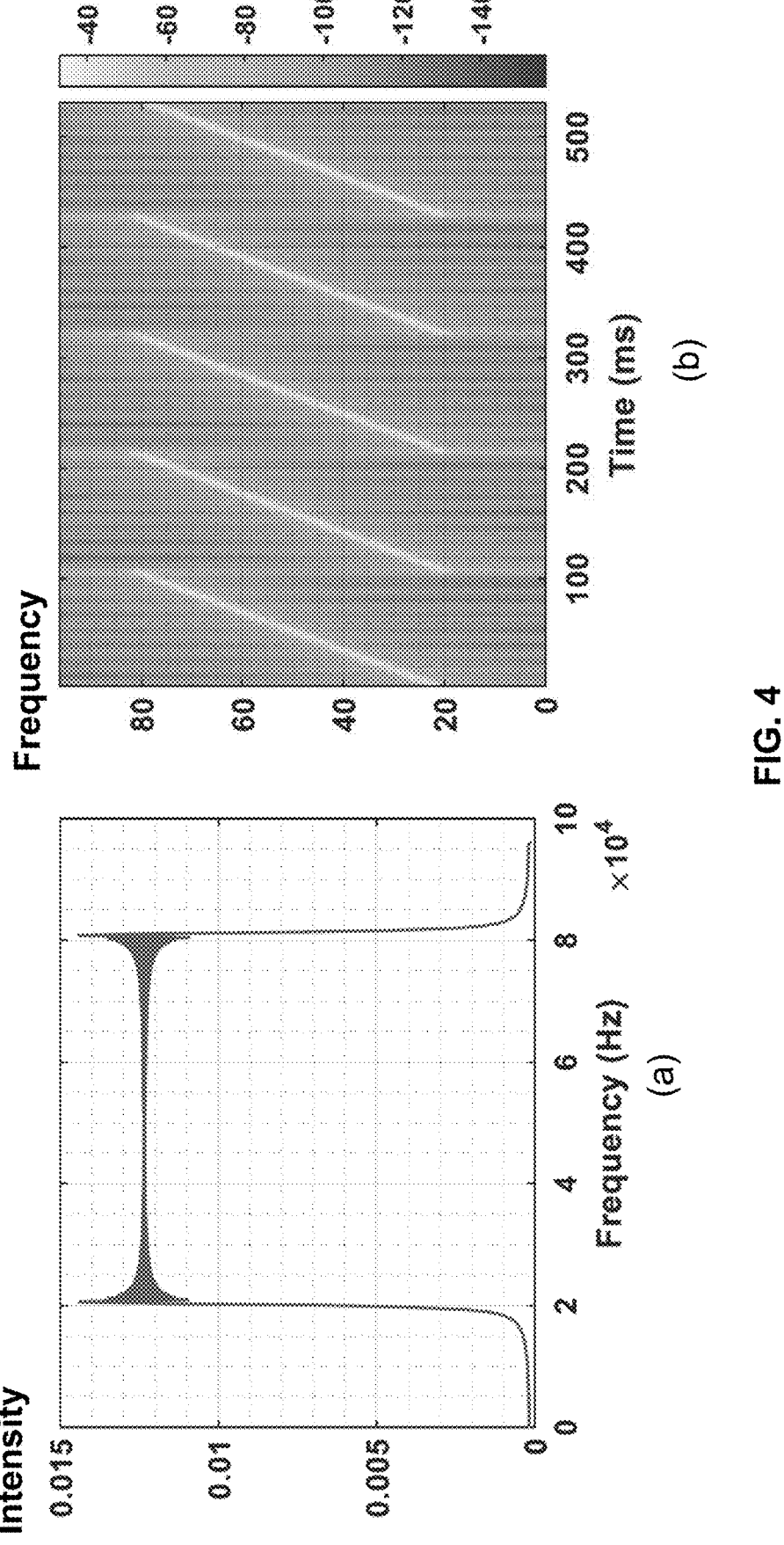
FIG. 4 shows graph (a) illustrating a chirp signal in a frequency domain, and graph (b) illustrating a spectrogram of chirp signals that are generated by an piezoelectric element of an object including the apparatus of FIGS. 1 and 2.

FIG. 4 shows graph (a) illustrating a linear acoustic chirp signal in a frequency domain and graph (b) illustrating a spectrogram of the linear acoustic chirp signal in a frequency-time domain.

The TX piezoelectric element 110a launches a linear chirp signal that sweeps from 20-80 kHz, each frequency bin having a substantially equal intensity. As shown in graph (a) of FIG. 4, an acoustic chirp signal transmitted from the TX piezoelectric element 110a may have a constant intensity from 20 kHz to 80 kHz, and as shown in graph (b) of FIG. 4, the frequency of each consecutive chirp signal may linearly increase over time. In this example, the TX piezoelectric element 110a launches five (5) consecutive linear chirp signals, wherein each of the linear chirp signals sweeps from 20-80 kHz, and each frequency bin has an equal intensity.

The TX piezoelectric element 110a may transmit chirp signals at every preset time interval T, wherein T is in a range from 900 ms to 110 ms, and for example, may be set to 106.7 ms for a desirable result. The touch location estimator 160 and the touch pressure estimator 170 may estimate a touch location and a touch pressure within one chirp. The TX piezoelectric element 110a may generate chirp signals in an ultrasound range so that the chirp signals do not disturb humans who interact with the apparatus 100 (e.g., a robot). However, a frequency range of the chirp signals is not limited to the ultrasound range, and the chirp signals may be generated to have a different frequency range.

In an example, a chirp signal is transmitted from the TX piezoelectric element 110a passes through a robot surface and is received by the RX piezoelectric element 110b. A robot arm works as a wireless channel in this system. Denoting a transmitted chirp signal as s(t), and a wireless channel between the TX piezoelectric element 110a and the RX piezoelectric element 110b as h(t), a received chirp signal r(t) can be represented as:

$$r(t) = h(t) * s(t) + n(t) \tag{2}$$

where n(t) is internal and external system noise, and * denotes a convolution operator. A high level idea is to detect a touch event, and to estimate a touch location as well as a touch pressure, from the received signal r(t) under the time varying channel response h(t) and the noise n(t).

The channel h(t) is frequency selective and the received signal r(t) can be represented in a frequency domain as:

$$R(f) = H(f) * S(f) + N(f) \tag{3}$$

The channel h(t) is mainly determined by a combination of mechanical characteristics of a moving object (e.g., a pose of a robot and an arm internal gear structure), occurrence of a touch event, and a touch location and a touch pressure when touch has occurred.

When a robot is touched, the channel response h(t) changes accordingly. This change in the channel response h(t) can be represented as:

$$\bar{R}(f) = [H(f) + \Delta H(f)]S(f) + N(f) \tag{4}$$

Where $\Delta H(f)$ denotes a channel alternation introduced by a touch.

Figure 5:
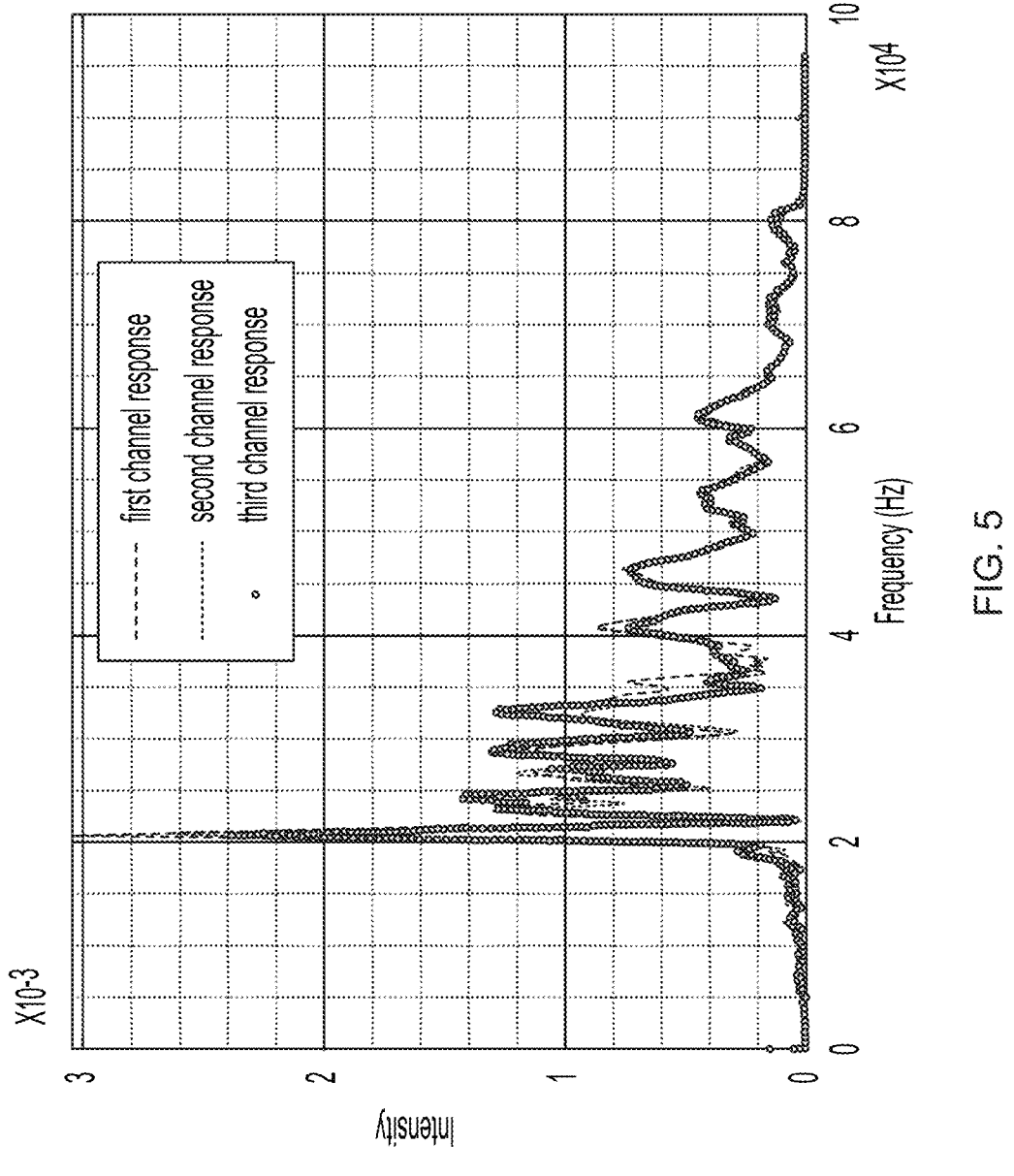
FIG. 5 shows graphs illustrating channel responses of received signals when an object including the apparatus of FIGS. 1 and 2 is not touched, and when the object is touched at two different locations of the object.

FIG. 5 shows a first channel response when there is no touch, and a second channel response when a robot is touched at location A, and a third channel response when the robot is touched location B which is 2 cm apart from location A.

As shown in FIG. 5, the first, second, and third channel responses are mutually different across the frequency band.

The tactile sensing system uses $\Delta H(f)$ as features for estimating a touch location. Given that $\Delta H(f)$ is also correlated with a touch pressure as well as a touch location, the tactile sensing system uses a wide range of frequencies in ASW signaling, to find a combination of frequency dependent channel variations $\Delta H(\bar{f})$ that can reliably recognize the contact location under varying touch pressure.

Touch location estimation may be performed in two phases. In a first phase, the system collects an ASW signal when a user touches every possible locations only one time with varying force, calculates $\Delta H(f)$ for each touch, and performs a one-shot training on a neural network, for example, using a support vector machine (SVM) with a radial basis function (RBF) kernel. The trained SVM may be constituted with a linear combination of frequency dependent channel variations $\Delta H(\bar{f})$. In a second phase, the system uses a pre-trained neural network to estimate the touch location.

The RX piezoelectric element 110b receives a chirp signal while a robot is moving. The received chirp signal may include noises n that come from an object (e.g., a robot arm). There are two types of noises: (1) electrical noise (e.g., pulse width modulation (PWM) noise) coming from a power supply modulated with motors that exists for both moving and stationary arms; and (2) mechanical noise coming from the motors and gears operating when the arm is moving. The electric noise and the mechanical noise may distort $\Delta H(f)$ that is used for estimating a touch location.

Figure 6:
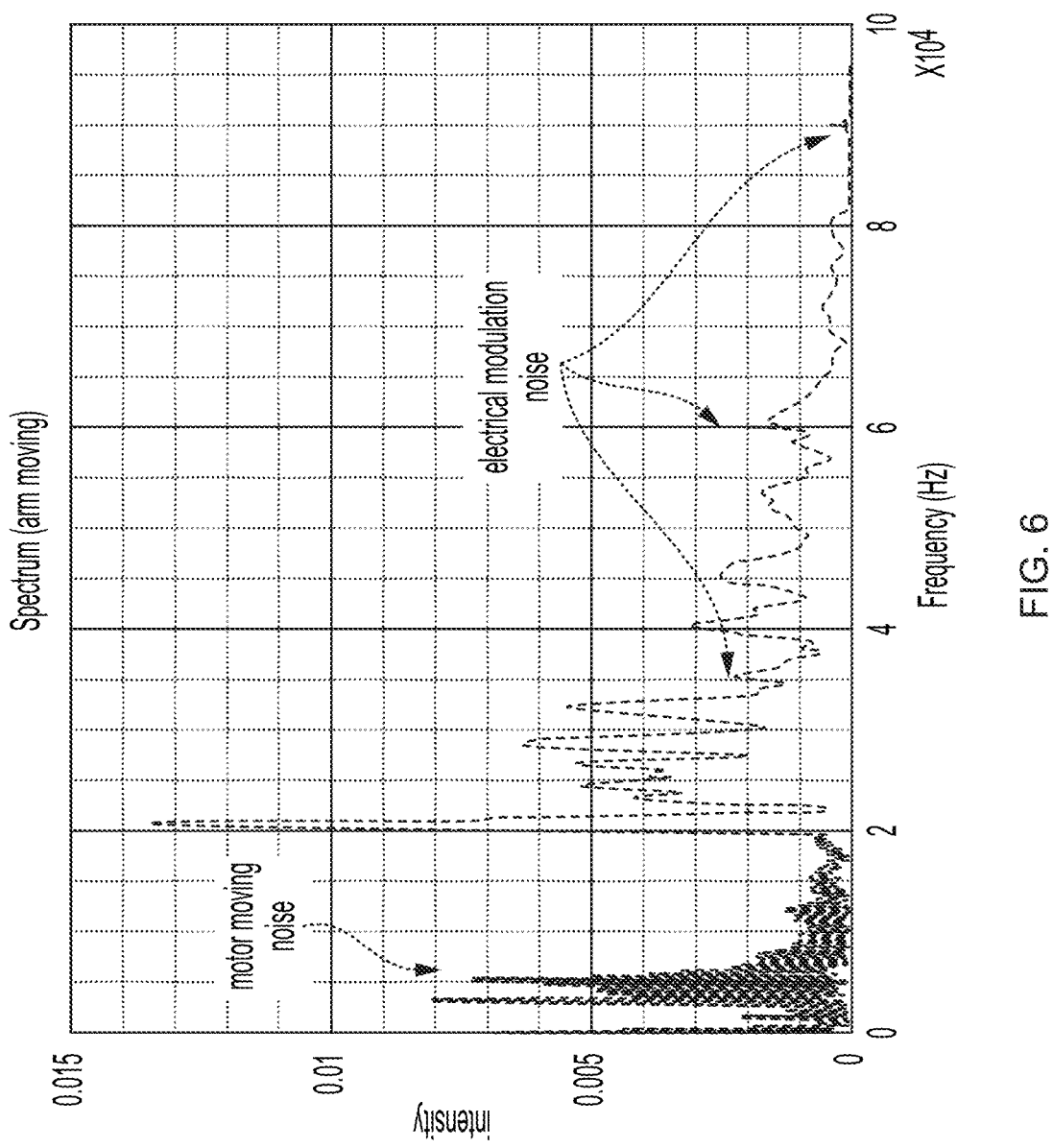
FIG. 6 is a graph illustrating a spectrogram of a received signal including a mechanical noise and an electrical noise when an object is moving.

FIG. 6 is a graph illustrating a noise spectrum when an object is moving.

The noise spectrum is calculated from a signal that records a robot arm randomly moving for 10 minutes, while no excitation signal is applied on a piezoelectric element. A majority of a mechanical noise energy resides below a 20 kHz range, and there are also significant electrical noise spikes at 30 kHz, 60 kHz, and 90 kHz.

To address this issue, the frequency selector 130 may perform an Optimal Spectrum Prorating Algorithm (OSPA).

Figure 7:
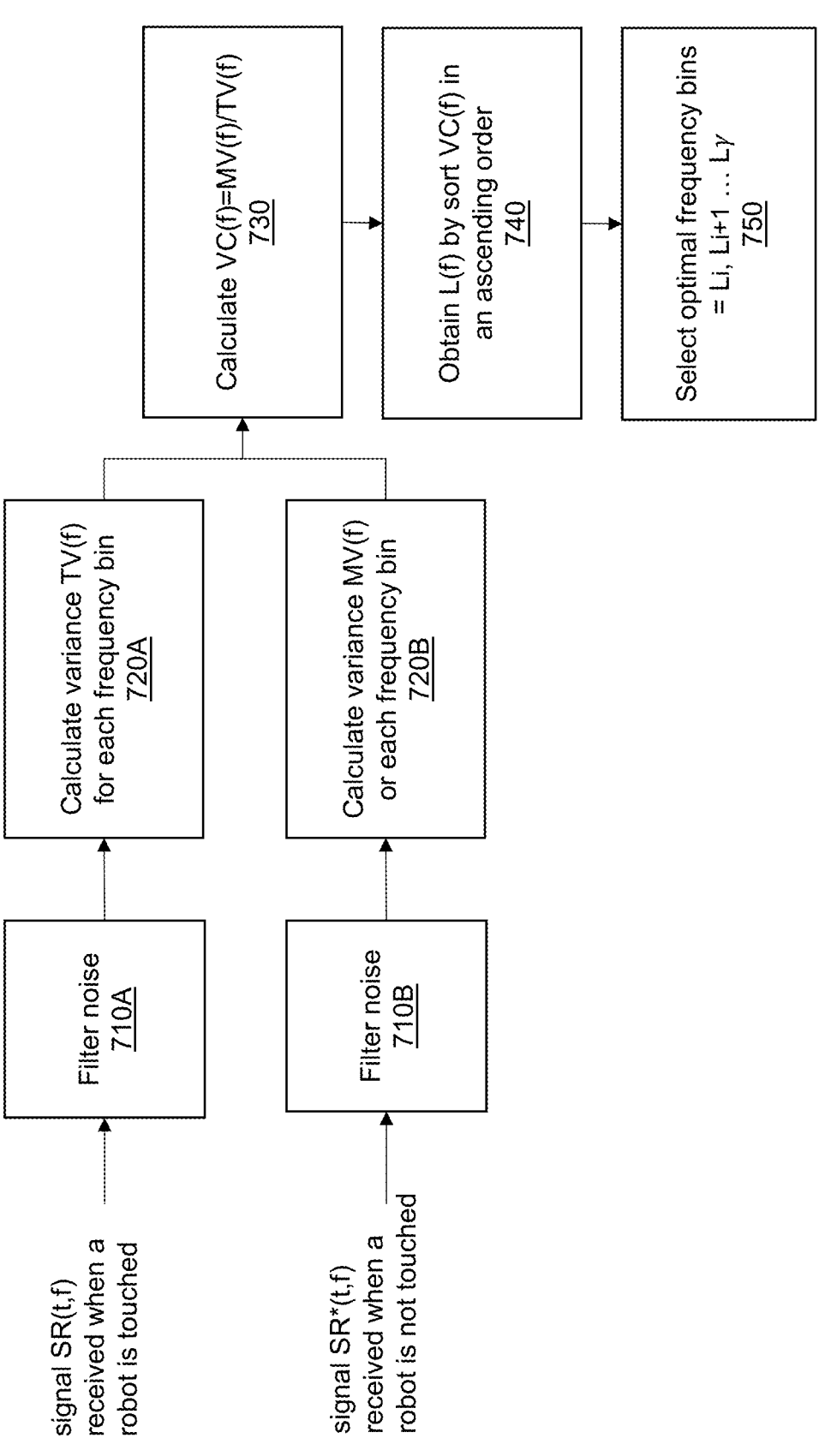
FIG. 7 is a diagram illustrating an optimal spectrum prorating algorithm (OSPA) according to embodiments.

FIG. 7 is a diagram illustrating an Optimal Spectrum Prorating Algorithm (OSPA) according to embodiments.

In operation 710A and 710B, the frequency selector 130 may receive a chirp signal SR(t, f) when all predetermined touch locations on a robot surface are touched, and may receive another chirp signal SR*(t, f) while the robot is not touched. The frequency selector 130 may apply a filter to remove the mechanical noise that resides below the 20 kHz range, and also to remove the electrical noises corresponding to 30 kHz, 60 kHz, and 90 kHz from the chirp signal SR(t, f) and the chirp signal SR*(t, f), where t is a time index and f is a frequency bin index in the spectrogram. For example, the frequency selector 120 may apply a high pass filter to remove the mechanical noise that resides below the 20 kHz, and may apply band stop filters to remove the electrical noises at 30 kHz, 60 kHz, and 90 kHz.

In operation 720A, the frequency selector 130 may identify a first set of frequency bins that are more sensitive to touch than the remaining frequency bins, using a spectrogram of SR(t, f) that is received when a robot is touched during a movement of the robot.

Figure 8A:
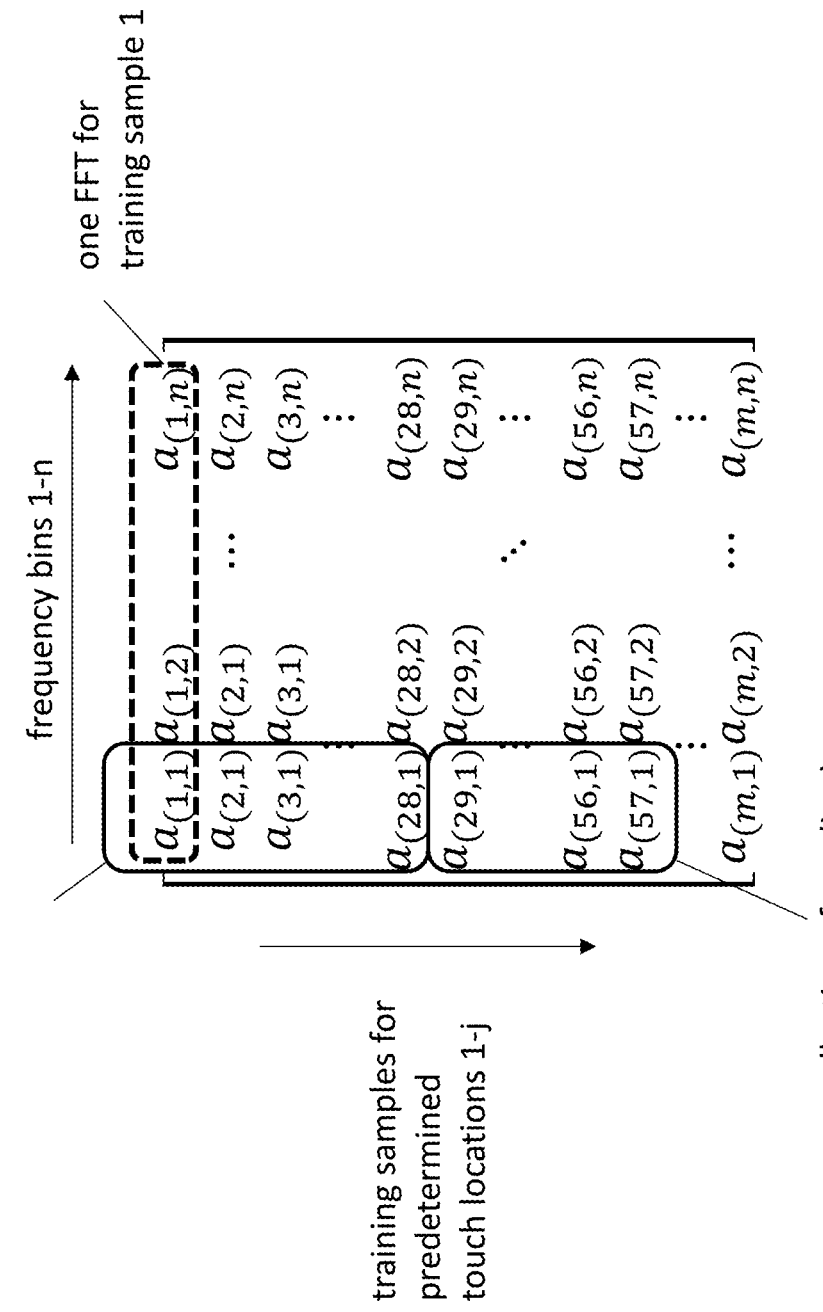
FIGS. 8A and 8B illustrate a matrix that represents a spectrogram of SR(t, f) that is received when a robot is touched during a movement of the robot.
Figure 8B:
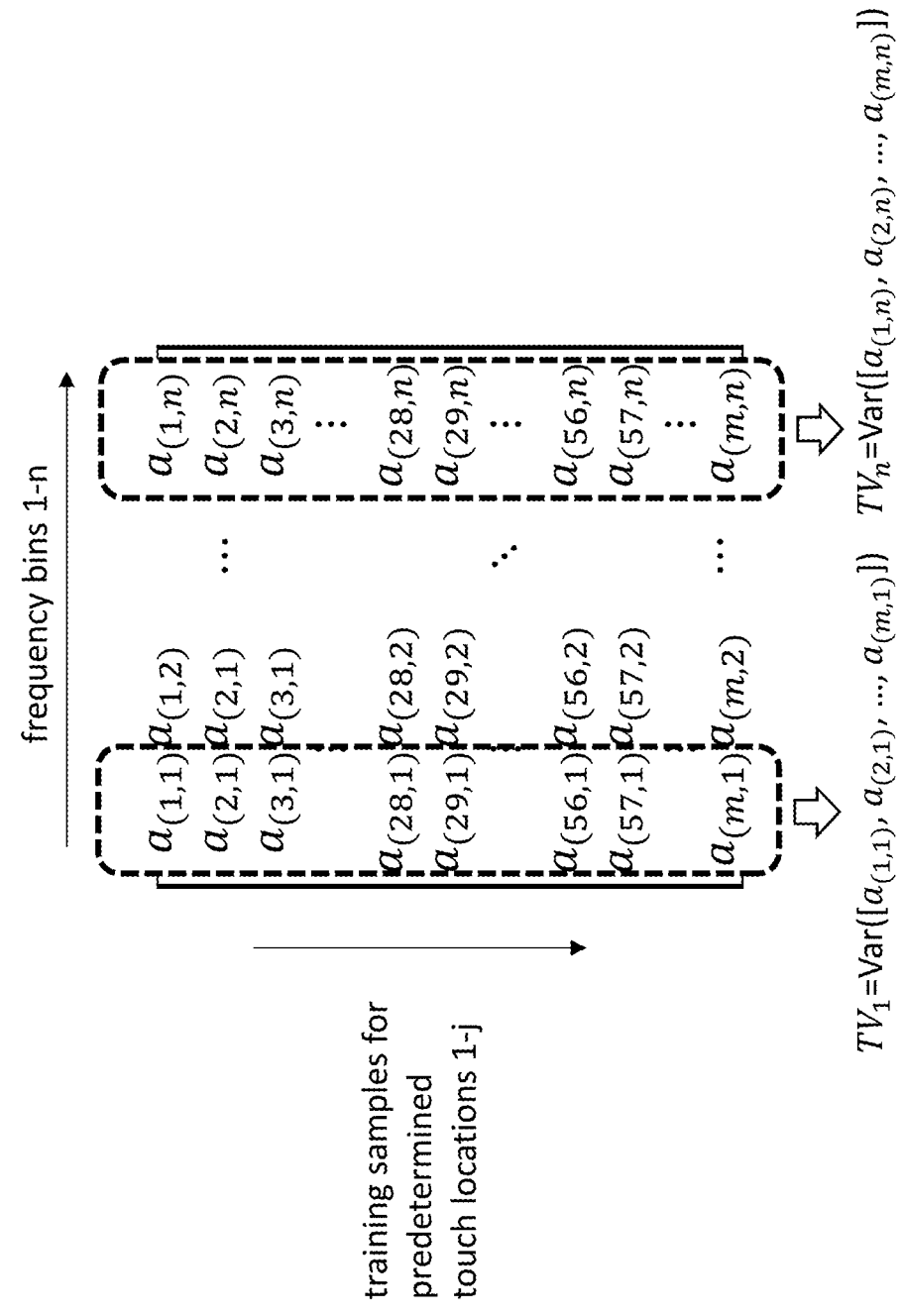

FIGS. 8A and 8B illustrate a matrix that represents a spectrogram of SR(t, f) that is received when a robot is touched during a movement of the robot.

FIG. 8A shows a matrix that represents a spectrogram of SR(t, f) that is received when all predetermined touch locations on a robot surface are touched while the robot is moving. In this example, there are an n number of frequency bins (i.e., frequency bin 1, 2, 3, . . . , n), there are a j number of predetermined touch locations (touch location 1, 2, . . . , j), and each of the j number of predetermined touch locations is touched with 28 varying forces. For frequency bin 1, touch location 1 is touched with 28 varying forces to obtain amplitudes $a_{(1, 1)}$, $a_{(2, 1)}$, $a_{(3, 1)}$, . . . , $a_{(28, 1)}$, and touch location 2 is touched with 28 varying forces to obtain amplitudes $a_{(29, 1)}$, $a_{(30, 1)}$, $a_{(31, 1)}$, . . . , $a_{(57, 1)}$. For each frequency bin, an m number of training samples are acquired, wherein m corresponds to 28×j. The number of frequency bins, the number of predetermined touch locations, and the number of varying forces, are provided as examples, and these numbers may be set to different numbers.

Referring back to FIG. 7, in operation 720A, the frequency selector 130 may calculate a touch variance vector TV(f) for each frequency bin based on the following equation:

$$TV(f) = \frac{\sum_{t=0}^{n-1} \left( SR(t, f) - \frac{\sum_{t=0}^{n-1} SR(t, f)}{n} \right)^2}{n} \tag{5}$$

Where n denotes a length of SR(t, f). TV(f) represents an energy variance of each frequency bin caused by touching all predetermined locations on the robot. The higher TV(f) is, the more sensitive the corresponding frequency bin is to touch.

As shown in FIG. 8B, the frequency selector 130 may calculate touch variance vectors $TV_1(f)$, $TV_2(f)$, . . . , $TVn(f)$ for frequency bins 1, 2, . . . , n.

Referring back to FIG. 7, in operation 720B, the frequency selector 130 may identify a second set of frequency bins that are less sensitive to robot movement than the remaining frequency bins, using a spectrogram of SR*(t, f) that is received when a robot is not touched during a movement of the robot.

Figures 9A, 9B:
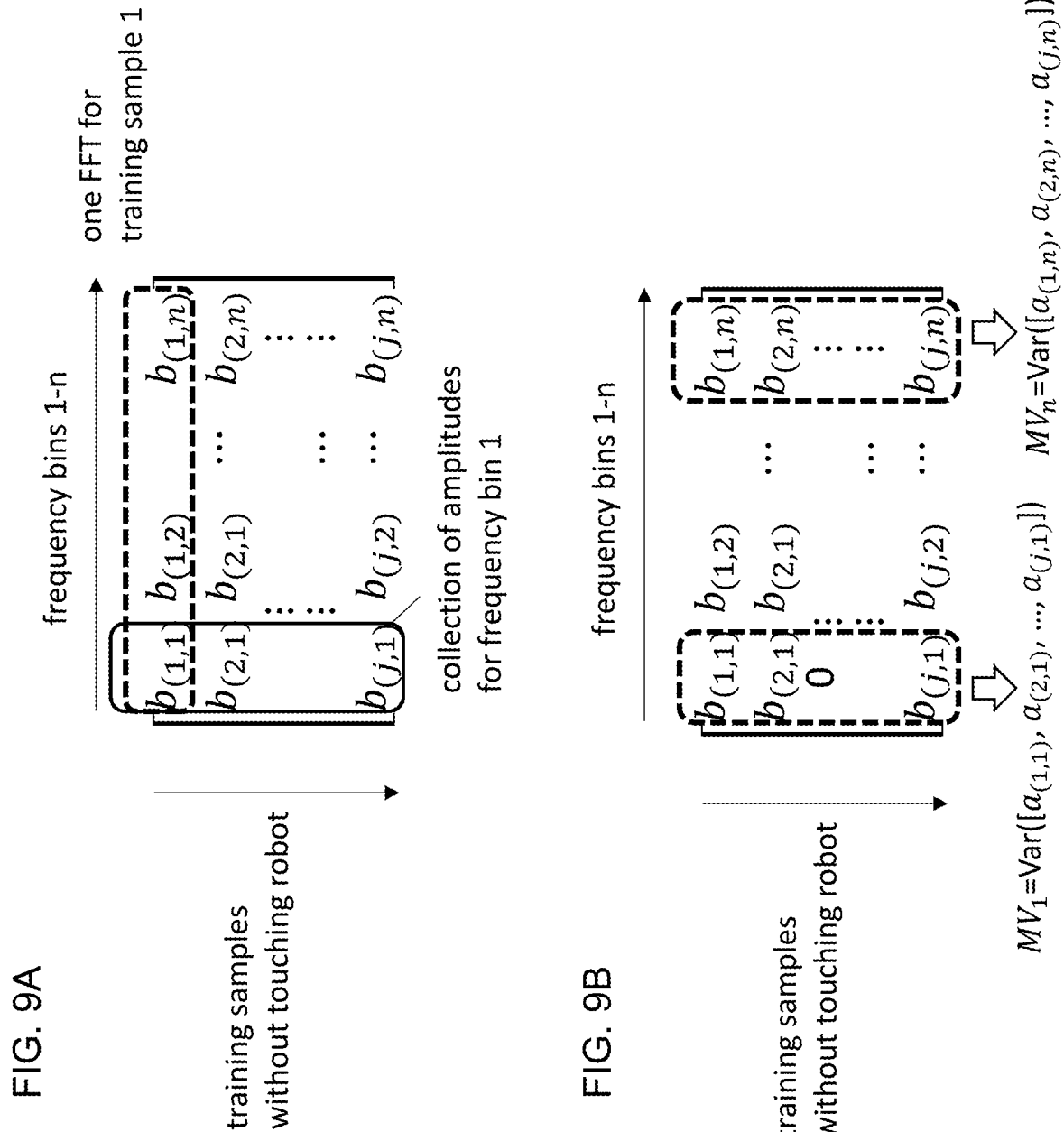
FIGS. 9A and 9B illustrate a matrix that represents a spectrogram of SR*(t, f) that is received when a robot is not touched during a movement of the robot.

FIGS. 9A and 9B illustrate a matrix that represents a spectrogram of SR*(t, f) that is received when a robot is not touched during a movement of the robot.

As shown in FIG. 9A, the frequency selector 130 may collect SR*(t, f) while the robot is moving and while there is no touch on the robot surface.

As shown in FIG. 9B, the frequency selector 130 may calculate a motor moving variance vector MV(f) for each frequency bin based on the following equation:

$$MV(f) = \frac{\sum_{t=0}^{n-1} \left( SR^*(t, f) - \frac{\sum_{t=0}^{n-1} SR^*(t, f)}{n} \right)^2}{n} \tag{6}$$

The smaller MV(f) is, the less sensitive the corresponding frequency bin is to robot moving.

Referring back to FIG. 7, in operation 730, the frequency selector 130 may employ TV(f) and MV(f) in an adversarial manner. For example, the frequency selector 130 may compute a variance contesting vector VC(f) based on the following equation:

$$VC(f) = \frac{MV(f)}{TV(f)} \tag{7}$$

The smaller VC(f) is, the better the corresponding frequency bin works for touch location estimation.

In operation 740, the frequency selector 130 may obtain L(f) by sorting VC(f) in an ascending order.

In operation 750, the frequency selector 130 may select optimal frequency bins $L_i$, $L_{i+1}$, . . . $L_\gamma$ by applying a preset threshold $\gamma$, wherein i is 1, and $\gamma$ is an integer less than a total number of frequency bins, and L(f) increases in the order of $L_i$, $L_{i+1}$, . . . , $L_\gamma$. For example, when the entire frequency range of a received (and filtered) chirp signal r(t) is classified into 5,000 frequency bins, and the preset threshold $\gamma$ is set to 300, the frequency selector 130 may select 300 frequency bins from the total frequency bins, in the ascending order of VC(f).

The OSPA according to an embodiment may be implemented as shown in Algorithm 1.

---

Algorithm 1 Optimal Spectrum Prorating Algorithm

---

1: function OSPA($\mathcal{R}$(t, f), $\mathcal{R}^\star$(t, f))
2:     $F_{selected}$ = NULL
3:     $\mathcal{SR}$(t, f) and $\mathcal{SR}^\star$(t, f) ← Matched Filtering $\mathcal{R}$(t, f) and $\mathcal{R}^\star$(t, f)
4:     TV(f) ← Variance $\mathcal{SR}$(t, f)
5:     MV(f) ← Variance $\mathcal{SR}^\star$(t, f)
6:     $VC(f) = \frac{MV(f)}{TV(f)}$
7:     L(f) ← Ascending Sort VC(f)
8:     for i ← 1 to γ do
9:         $F_{Selected}$(i) = L(i)
10:    end for
11:    return $F_{Selected}$
12: end function

---

Where R(t, f) and R*(t; f) are spectrograms of collected signals with touch and without touch, respectively, during the one-shot training, and γ is a preset threshold. γ is an integer number less than a total number of frequency bins of the spectrograms.

Additionally, the frequency selector 130 may determine an optimal preset threshold γ* based on the following equation:

$$\gamma^* = \max(a \times accuracy + b/\gamma) \tag{8}$$

Where accuracy denotes a touch prediction accuracy of a classifier, and a and b are constants.

Figure 10:
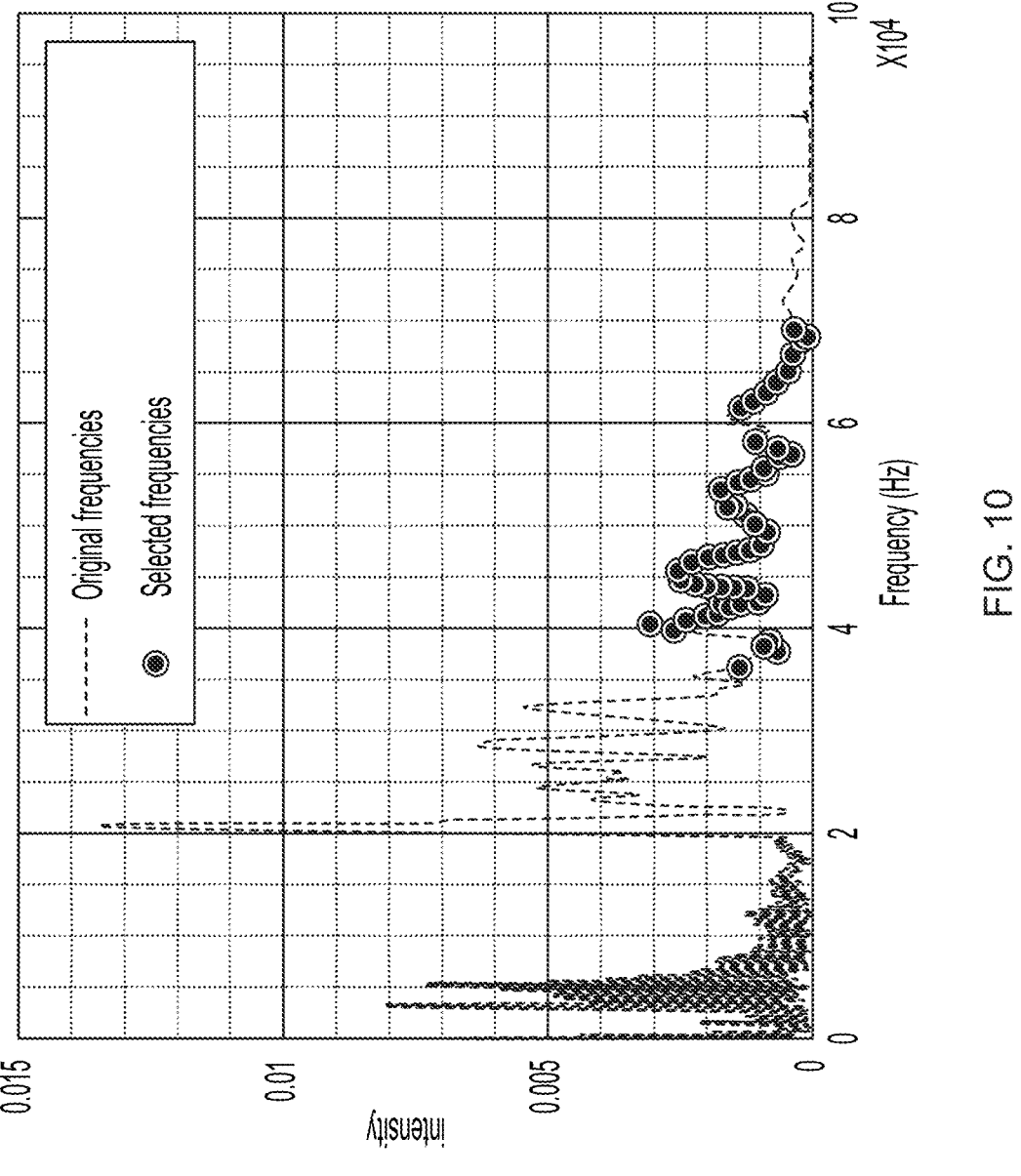
FIG. 10 is a graph illustrating frequencies selected from originally existing frequencies in a filtered received chirp signal or a received chirp signal, according to embodiments.

FIG. 10 is a graph illustrating frequencies selected from originally existing frequencies in a filtered received chirp signal or a received chirp signal.

As shown in FIG. 10, the selected frequencies may be in a range from 40 kHz to 70 kHz. Since the selected frequencies can be different from the most efficient frequency range (e.g., a frequency range from 20 kHz to 30 kHz) for a piezoelectric transceiver, the OSPA according to an embodiment may be needed to identify optimal frequencies for estimating a touch location on a robot surface. In an embodiment, the OSPA is designed based on various factors, such as sensor efficiency, wavelength, localization resolution, motor noise profile, and channel inhomogeneity, the OSPA balances the various factors to select the optimal frequencies for a moving robot.

As a robot is moving, the temperature of the robot surface may continuously rise, and the change in the temperature may affect a wave pattern of a received chirp signal and may degrade the accuracy in touch location estimation.

To resolve this issue, the online updater 140 may update prediction features of a classifier that provides a touch prediction score S for each of predetermined touch locations N, during each detection (e.g., every chirp). S is represented as an N×1 vector where N is the number of predetermined touch locations. A final touch location is determined by identifying a location having the highest touch prediction score S, from the predetermined touch locations N. The classifier may be implemented by using at least one neural network, for example, a linear SVM model.

Once the optimal frequencies are selected, a filtered received chirp signal having the selected frequencies is provided to the classifier to acquire touch prediction scores S. To have the classifier adapted to the temperature drift, the tactile sensing system may collect a preset length (e.g., 3 seconds) of chirp signal data for calibration while there is no touch occurring on the robot surface, every time when the system is rebooted. The online updater 140 may calculate an average touch prediction score $S_c$ for all predetermined touch locations during the calibration. After the calibration, the tactile sensing system predicts a touch location by using a new feature, $S_{final}=S-S_c$. The online updater 140 may update $S_c$ at a preset time interval (e.g., every 20 min).

The calibration may occur according to a user manipulation, or may be automatically performed in a preset time interval range (e.g., every 15 min to 20 min) while no touch event is detected. If a touch is detected in the preset time interval range, the online updater 140 may output a voice message or a visual message to guide a user of the robot not to touch the robot, so that calibration can be started.

| Algorithm 2 Preiction By Online Feature Updating |
| --- |

| 1: | function UPDATING($\mathcal{R}$(t, f), $\mathcal{R}_c$(t, f)) |
| 2: | $S_{Final}$ = NULL |
| 3: | for Every $\alpha$ minutes do |
| 4: | for t $\leftarrow$ 1 to $\beta$ do |
| 5: | $\mathcal{R}_c$ (t, $F_{Selected}$) $\leftarrow$ OSPA $\mathcal{R}_c$(t, f) |
| 6: | $S_c$(t) $\leftarrow$ Predict $\mathcal{R}_c$(t, $F_{Selected}$) |
| 7: | end for |
| 8: | $S_c$ $\leftarrow$ Average $S_c$(t) |
| 9: | end for |
| 10: | $\mathcal{R}$(t, $F_{Selected}$) $\leftarrow$ OSPA $\mathcal{R}$(t, f) |
| 11: | S (t) $\leftarrow$ Predict $\mathcal{R}$(t, $F_{Selected}$) |
| 12: | $S_{Final}$(t) = S (t) $-$ $S_c$ |
| 13: | return $S_{Final}$(t) |
| 14: | end function |

Where $R_c$(t, f) is a spectrogram of a received chirp signal during calibration, R(t, f) is a spectrogram of a received signal during the operation of a robot after calibration, $\alpha$ is an updating rate (e.g., 20 minutes), and $\beta$ is a calibration duration (e.g., 3 seconds).

The updating rate a may be determined to a value that maximizes a resulting value of the following equation:

$$c \times \text{prediction accuracy} + d \times \text{time} \tag{9}$$

Where c and d are constants, and prediction accuracy denotes a touch prediction accuracy of a classifier, and time denotes a time that has elapsed since the robot is powered on or since the last calibration time.

When a robot is rebooted and starts running, the online updater 140 records a received chirp signal for a predetermined time duration (e.g., 3 seconds) while there is no touch being made on the robot, and calculates an average touch prediction score by averaging all touch prediction scores for all predetermined touch locations, and substrates the average touch prediction score from a current touch prediction score to compensate for temperature drift.

After the online feature updating, a touch prediction score becomes close to zero when there is no touch, but has a high value when there is a touch input.

The touch detector 150 applies a detection threshold to determine that touch has occurred when the touch prediction score is greater than or equal to the detection threshold, but determines that there is no touch when the touch prediction score is less than the detection threshold.

After determining whether touch has occurred for each of the predetermined touch locations, the touch location estimator 160 may determine, as a final touch location, a location having the highest touch prediction score, among the plurality of touch locations.

The touch pressure estimator 170 may estimate a touch pressure based on a change in a wave pattern of a received chirp signal, and a ground truth pressure G(t) that is measured by a force sensor.

At a first step, the touch pressure estimator 170 calculates a total energy E(t) across an entire chirp frequency band from $f_1$ to $f_2$, as follows:

$$E(t) = \sum_{f=f_1}^{f_2} R(t, f) \tag{10}$$

In an embodiment of the disclosure, the total energy may be computed across optimal frequencies selected by the frequency selector 130 rather than being calculated across the entire chirp frequency band. The total energy across the selected frequencies may be expressed as $E^O(t) = \Sigma_{f \subseteq F_{selected}} R$ (t, f).

At a second step, the touch pressure estimator 170 estimates a touch pressure P(t) using a first order Fourier model based on equation (9) or equation (10):

$$P(t) = a\cos(\omega E(t)) + b\sin(\omega E(t)) + c \tag{11}$$

$$P(t) = a\cos\left(\omega E^O(t)\right) + b\sin\left(\omega E^O(t)\right) + c \tag{12}$$

Where $\alpha$, $\omega$, b, and c are pressure prediction parameters that are calculated based on the following equation:

$$\arg\min_{a,b,\omega,c} \sum_{t=0}^{n-1} (P(t) - G(t))^2 \tag{13}$$

In calculating the pressure prediction parameters according to equation (11), the touch pressure estimator 170 may compare an estimated touch pressure P(t) and a ground truth pressure G(t) that correspond to the same predetermined touch location, among a plurality of predetermined touch location. The touch pressure estimator 170 may identify the pressure prediction parameters $\alpha$, $\omega$, b, and c that minimize a mean square error of the estimated touch pressure P(t) with respect to the ground truth pressure G(t).

Figure 11:
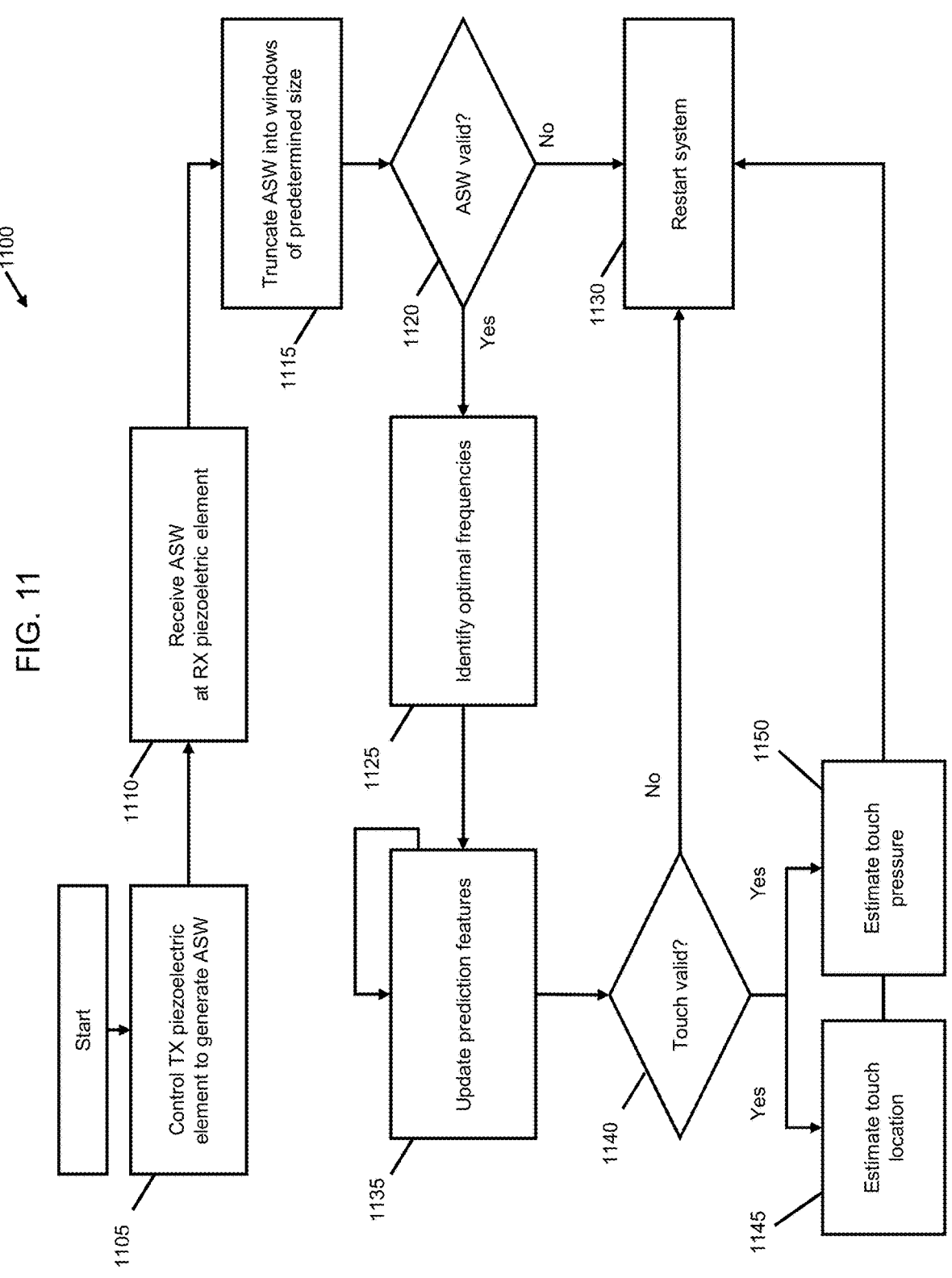
FIG. 11 is a flowchart of a method of acquiring and processing tactile sensing data according to embodiments.

FIG. 11 is a flowchart of a method 1100 of acquiring and processing tactile sensing data according to embodiments.

The method 1100 may be performed by at least one processor using the apparatus 100 of FIGS. 1 and 2.

As shown in FIG. 11, in operation 1105, the method 1100 includes controlling a transmission (TX) piezoelectric element included in an object (e.g., a robot arm) to inject an acoustic wave signal to a surface of the object to generate an acoustic surface wave (ASW). The acoustic wave signal may be implemented as a linear chirp signal that sweeps from 20 kHz to 80 kHz. The linear chirp signal may have a frequency that linearly increases over time, and has a substantially constant amplitude, within a predetermined frequency range, for example, in a range from 20 kHz to 80 kHz. The TX piezoelectric element may generate a linear chirp signal at every preset time interval T. The present time interval T may be set to be in a range from 90 ms to 110 ms. For example, the TX piezoelectric element may generate five (5) consecutive chirp signals, at the present time interval T of 106.7 ms, wherein each of the five consecutive chirp signals has a linearly increasing frequency over time and has a substantially constant amplitude from 20 kHz to 80 kHz.

In operation 1110, the method 1100 includes receiving the ASW at a reception (RX) piezoelectric element included in the object.

In operation 1115, the method 1100 includes truncating the ASW into windows of a predetermined time duration.

In operation 1120, the method 1100 includes determining whether the ASW is valid by comparing a reference ASW and the received ASW. When the TX piezoelectric element generates the ASW, the system stores a wave pattern of the generated ASW as the reference ASW, to determine that the received ASW is valid when a similarity between the received ASW and the reference ASW is greater than a preset threshold.

Based on the ASW being determined to be valid, the method 1100 continues in operation 1125. Otherwise, the method 1100 continues in operation 1130, in which a system is restarted.

In operation 1125, the method 1100 includes identifying optimal frequency bins for estimating a touch location and a touch pressure.

In operation 1135, the method 1100 includes updating prediction features (e.g., prediction scores) of a classifier at a preset time interval (e.g., every 10 min).

In operation 1140, the method 1100 includes determining whether a touch is valid. The classifier may output a touch prediction score for each of all predetermined touch locations. After the prediction features of the classifier are updated in operation 1135, prediction scores of the classifier become close to zero when there is no touch, but the prediction scores are high when there is touch. In particular, if the touch score is higher than a detection threshold, the touch is determined to be valid, and otherwise, is determined to be invalid.

Based on the touch being determined to be valid, the method 1100 continues in operation 1145 and 1150. Otherwise, the method 1100 continues in operation 1130, in which the system is restarted.

In operation 1145, the method 1100 includes estimating a touch location by inputting the received (and filtered) ASW of the selected frequencies to the classifier having the updated prediction features.

In operation 1150, the method 1100 includes estimating a touch pressure by applying a first order Fourier model to a total energy of the received acoustic wave signal across the selected optimal frequency bands.

FIG. 12 is a flowchart of a method 1200 of a method of estimating a touch location and a touch pressure of a touch input that is made at an arbitrary location of an object, according to embodiments.

The method 1200 may be performed by at least one processor using the apparatus 100 of FIGS. 1 and 2.

As shown in FIG. 12, in operation 1210, the method 1200 includes controlling a TX piezoelectric element to generate an acoustic wave having a chirp spread spectrum (CSS) at every preset time interval, along a surface of an object (e.g., a robot). The CSS may have a linearly increasing frequency over time and may have a constant amplitude within a predetermined frequency range.

In operation 1220, the method 1200 includes receiving, via an RX piezoelectric element, an acoustic wave signal corresponding to the generated acoustic wave.

In operation 1230, the method 1200 includes filtering the received acoustic wave signal, using at least one filter configured to reduce an electrical noise of the robot and a mechanical noise of the robot, from the received acoustic wave signal. The electrical noise may include a pulse-width modulation (PWM) noise of the robot. The at least one filter may filter the PWM noise at 30 kHz, 60 kHz, and 90 kHz of the received acoustic wave signal, and may filter the mechanical noise that resides below a 20 kHz range of the received acoustic wave signal.

In operation 1240, the method 1200 includes selecting optimal frequency bands from a plurality of frequency bands of the acoustic wave signal, based on a first variance of the acoustic wave signal that is received when the object is touched during a movement of the object, and a second variance of the acoustic wave signal that is received when the object is not touched during the movement of the object.

The selecting the optimal frequency bands may include selecting a predetermined number γ of the optimal frequency bands in an ascending order of a ratio of the second variance to the first variance of the received acoustic wave signal. γ may be predetermined such that a weighted sum of a touch prediction accuracy of a neural network (e.g., a classifier) and an inverse of γ is maximized In operation 1250, the method 1200 includes updating prediction features of the neural network to remove the temperature drift effect of the robot. At a preset calibration interval (e.g., every 20 min), a baseline touch prediction score is obtained for a plurality of predetermined locations on the surface of the object, when the surface of the object is not touched. When the surface of the object is touched after calibration, the touch prediction score obtained from the neural network is adjusted based on the baseline touch prediction score. For example, an updated touch prediction score is obtained by subtracting the baseline touch prediction score from the touch prediction score that is directly obtained from the neural network, and the updated touch prediction score is used for a touch location estimation and a touch pressure estimation.

In operation 1260, the method 1200 includes estimating a location of a touch input on the surface of the object by inputting the received acoustic wave signal of the selected optimal frequency bands into the neural network (e.g., the classifier). The neural network is trained to provide a touch prediction score for each of a plurality of predetermined locations on the surface of the object. If the touch prediction score for a predetermined touch location is greater than or equal to a detection threshold, it is determined that the predetermined touch location is touched, and otherwise, it is determined that the predetermined touch location is touched. When multiple touch locations are detected, a location having the highest prediction score is determined as a final touch location, among the multiple touch locations.

In operation 1270, the method 1200 includes estimating a pressure of the touch input by applying a first order Fourier model to a total energy of the received acoustic wave signal across the selected optimal frequency bands.

Figure 13:
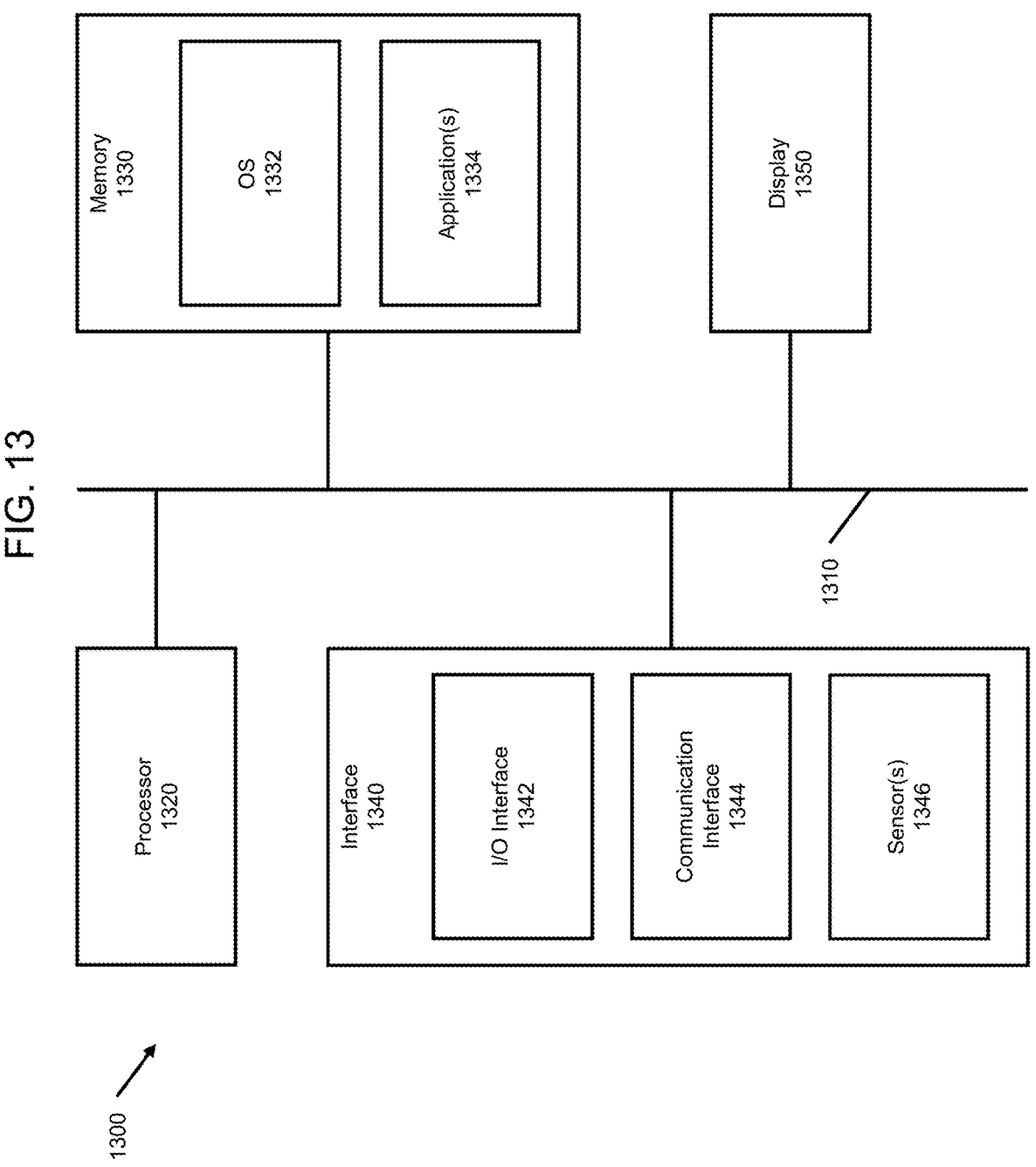
FIG. 13 is a block diagram of an electronic device in which the apparatus of FIGS. 1 and 2 is implemented, according to embodiments.

FIG. 13 is a block diagram of an electronic device 1300 in which the apparatus 100 of FIGS. 1 and 2 is implemented, according to embodiments.

FIG. 13 is for illustration only, and other embodiments of the electronic device 1300 could be used without departing from the scope of this disclosure.

The electronic device 1300 includes a bus 1310, a processor 1320, a memory 1330, an interface 1340, and a display 1350.

The bus 1310 includes a circuit for connecting the components 1320 to 1350 with one another. The bus 1310 functions as a communication system for transferring data between the components 1320 to 1350 or between electronic devices.

The processor 1320 includes one or more of a central processing unit (CPU), a graphics processor unit (GPU), an accelerated processing unit (APU), a many integrated core (MIC), a field-programmable gate array (FPGA), or a digital signal processor (DSP). The processor 1320 is able to perform control of any one or any combination of the other components of the electronic device 1300, and/or perform an operation or data processing relating to communication. The processor 1320 executes one or more programs stored in the memory 1330.

The memory 1330 may include a volatile and/or non-volatile memory. The memory 1330 stores information, such as one or more of commands, data, programs (one or more instructions), applications 1334, etc., which are related to at least one other component of the electronic device 1300 and for driving and controlling the electronic device 1300. For example, commands and/or data may formulate an operating system (OS) 1332. Information stored in the memory 1330 may be executed by the processor 1320.

The applications 1334 include the above-discussed embodiments. These functions can be performed by a single application or by multiple applications that each carry out one or more of these functions.

The display 1350 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1350 can also be a depth-aware display, such as a multi-focal display. The display 1350 is able to present, for example, various contents, such as text, images, videos, icons, and symbols.

The interface 1340 includes input/output (I/O) interface 1342, communication interface 1344, and/or one or more sensors 1346. The I/O interface 1342 serves as an interface that can, for example, transfer commands and/or data between a user and/or other external devices and other component(s) of the electronic device 1300.

The sensor(s) 1346 can meter a physical quantity or detect an activation state of the electronic device 1300 and convert metered or detected information into an electrical signal. For example, the sensor(s) 1346 can include one or more cameras or other imaging sensors for capturing images of scenes. The sensor(s) 1346 can also include any one or any combination of a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, and a fingerprint sensor. The sensor(s) 1346 can further include an inertial measurement unit. In addition, the sensor(s) 1346 can include a control circuit for controlling at least one of the sensors included herein. Any of these sensor(s) 1346 can be located within or coupled to the electronic device 1300. The sensors 1346 may be used to detect touch input, gesture input, and hovering input, using an electronic pen or a body portion of a user, etc.

The communication interface 1344, for example, is able to set up communication between the electronic device 1300 and an external electronic device. The communication interface 1344 can be a wired or wireless transceiver or any other component for transmitting and receiving signals.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to the electronic device 1300, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the server.

A neural network model related to estimating a touch location and a touch pressure described above may be implemented via a software module. When the neural network model is implemented via a software module (for example, a program module including instructions), the neural network model may be stored in a computer-readable recording medium.

Also, the neural network model may be a part of the apparatus 100 described above by being integrated in a form of a hardware chip. For example, the neural network model may be manufactured in a form of a dedicated hardware chip for artificial intelligence, or may be manufactured as a part of an existing general-purpose processor (for example, a CPU or application processor) or a graphic-dedicated processor (for example a GPU).

Also, the neural network model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

The above-described embodiments may provide a sensing modality, a ASW, which turns an entire robot surface into tactile skin that senses no-dead-spot touch on a robot arm. The embodiments realize whole surface touch detection on a robot surface, and as discussed above, this disclosure contemplates that the touch-detection systems and methods disclosure herein may be deployed on any suitable object. Several signal processing algorithms, hardware tweaks, and a neural network-based algorithm address challenges in using an ASW signal for touch location estimation and touch pressure estimation.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for identifying a location of a touch input, the apparatus comprising:
    a plurality of piezoelectric elements disposed at an object, and comprising a first piezoelectric element and a second piezoelectric element;
    at least one processor including processing circuitry; and
    a memory storing instructions that, when executed by the at least one processor individually or collectively, cause the apparatus to:
    control the first piezoelectric element to generate an acoustic wave, along a surface of the object;

receive, by using the second piezoelectric element, a signal corresponding to the generated acoustic wave;

identify a first variance of the signal that is received in case that the surface of the object is touched, and a second variance of the signal that is received in case that there is no touch on the surface of the object;

select frequency bands from a plurality of frequency bands of the signal, based on the first variance of the signal, and the second variance of the signal;

execute a neural network based on the received signal corresponding to the selected frequency bands, the neural network trained to provide touch prediction scores corresponding to a plurality of defined locations on the surface of the object; and identify a location of a touch input based on the touch predication scores provided from the neural network.

2. The apparatus of claim 1, wherein the generated acoustic wave has a chirp spread spectrum (CSS) at a defined time interval, and wherein the CSS has a linearly increasing frequency over time and has a constant amplitude within a predetermined frequency range.

3. The apparatus of claim 1, wherein the instructions that, when executed by the at least one processor individually or collectively, further cause the apparatus to:

reduce a noise of the received signal by filtering the received signal, the noise of the received signal comprising an electrical noise of the object and a mechanical noise of the object.

4. The apparatus of claim 3, wherein the object is a robot, and the electrical noise is a pulse-width modulation (PWM) noise of a motor of the robot, and wherein the instructions that, when executed by the at least one processor individually or collectively, cause the apparatus to:

filter out the PWM noise at 30 kHz, 60 kHz, and 90 kHz of the received signal, and filter out the mechanical noise that resides below a 20 kHz range of the received signal.

5. The apparatus of claim 1, wherein the least one processor is configured to:

select a defined number of the frequency bands in an ascending order of a ratio of the second variance to the first variance.

6. The apparatus of claim 1, wherein y is a defined number of the frequency bands that are selected from the plurality of frequency bands, and wherein the instructions that, when executed by the at least one processor individually or collectively, cause the apparatus to: determine $\gamma$ such that a weighted sum of a touch prediction accuracy of the neural network and an inverse of $\gamma$ is maximized.

7. The apparatus of claim 1, wherein the instructions that, when executed by the at least one processor individually or collectively, cause the apparatus to:

at a calibration duration, obtain a baseline touch prediction score for the plurality of defined locations on the surface of the object, in case that the surface of the object is not touched; and when the surface of the object is touched after calibration, adjust a touch prediction score obtained from the neural network based on the baseline touch prediction score.

8. The apparatus of claim 2, wherein the predetermined frequency range is a range from 20 kHz to 80 Hz, and the defined time interval is in a range from 90 ms to 110 ms.

9. The apparatus of claim 1, wherein the least one processor is further configured to:

estimate a pressure of the touch input by applying a first order Fourier model to a total energy of the received signal across the selected frequency bands.

10. A method for acquiring tactile sensing data, the method comprising:

controlling a first piezoelectric element to generate an acoustic wave, along a surface of an object;

receiving, by using a second piezoelectric element, a signal corresponding to the generated acoustic wave;

identifying a first variance of the received signal in case that the surface of the object is touched, and a second variance of the received signal in case that there is no touch on the surface of the object;

selecting frequency bands from a plurality of frequency bands of the received signal, based on the first variance of the signal, and the second variance of the signal;

executing, based on the received signal corresponding to the selected frequency bands, a neural network that is trained to provide touch prediction scores corresponding to a plurality of defined locations on the surface of the object; and identify a location of a touch input based on the touch prediction scores provided from the neural network.

11. The method of claim 10, wherein the generated acoustic wave has a chirp spread spectrum (CSS) at a defined time interval, and wherein the CSS has a linearly increasing frequency over time and has a constant amplitude within a predetermined frequency range.

12. The method of claim 10, further comprising:

reducing a noise of the received signal by filtering the received signal, wherein the noise of received signal comprising an electrical noise of the object and a mechanical noise of the object.

13. The method of claim 12, wherein the object is a robot, and the electrical noise is a pulse-width modulation (PWM) noise of a motor of the robot, and wherein the reducing comprises:

filtering out the PWM noise at 30 kHz, 60 kHz, and 90 kHz of the received signal; and filtering out the mechanical noise that resides below a 20 kHz range of the received signal.

14. The method of claim 10, wherein the selecting frequency bands comprises:

selecting a defined number of the frequency bands in an ascending order of a ratio of the second variance to the first variance of the received signal.

15. The method of claim 10, wherein y is a defined number of the frequency bands that are selected from the plurality of frequency bands, and wherein the selecting frequency bands comprises:

determining $\gamma$ such that a weighted sum of a touch prediction accuracy of the neural network and an inverse of $\gamma$ is maximized.

16. The method of claim 10, further comprising:

at a calibration interval, obtaining a baseline touch prediction score for the plurality of defined locations on the surface of the object, in case that the surface of the object is not touched; and based on the surface of the object being touched after calibration, adjusting a touch prediction score obtained from the neural network based on the baseline touch prediction score.

17. The method of claim 11, wherein the predetermined frequency range is a range from 20 kHz to 80 Hz, and the defined time interval is in a range from 90 ms to 110 ms.

18. The method of claim 10, further comprising:

estimating a pressure of the touch input by applying a first order Fourier model to a total energy of the received signal across the selected frequency bands.

19. A non-transitory computer-readable storage medium storing instructions that, when executed by at least one processor individually or collectively, cause the at least one processor to:

control a first piezoelectric element to generate an acoustic wave, along a surface of an object;

receive, by using a second piezoelectric element, a signal corresponding to the generated acoustic wave;

identify a first variance of the signal that is received in case that the surface of the object is touched, and a second variance of the signal that is received in case that there is no touch on the surface of the object;

select frequency bands from a plurality of frequency bands of the signal, based on the first variance of the signal and the second variance of the signal;

execute a neural network based on the received signal corresponding to the selected frequency bands, the neural network trained to provide touch prediction scores corresponding to a plurality of defined locations on the surface of the object; and identify a location of a touch input based on the touch prediction scores provided from the neural network.

20. The non-transitory computer-readable storage medium of claim 19, wherein the instructions cause the at least one processor to:

reduce a noise of the received signal by filtering the received signal, the noise of the received signal comprising an electrical noise of the object and a mechanical noise of the object.

* * * * *